Dec. 22, 1925.
E. F. NORTHRUP
1,566,500
INDUCTION HEATER FOR AND METHOD OF HEATING TIRE MOLDS
Filed Nov. 20, 1920  4 Sheets-Sheet 1
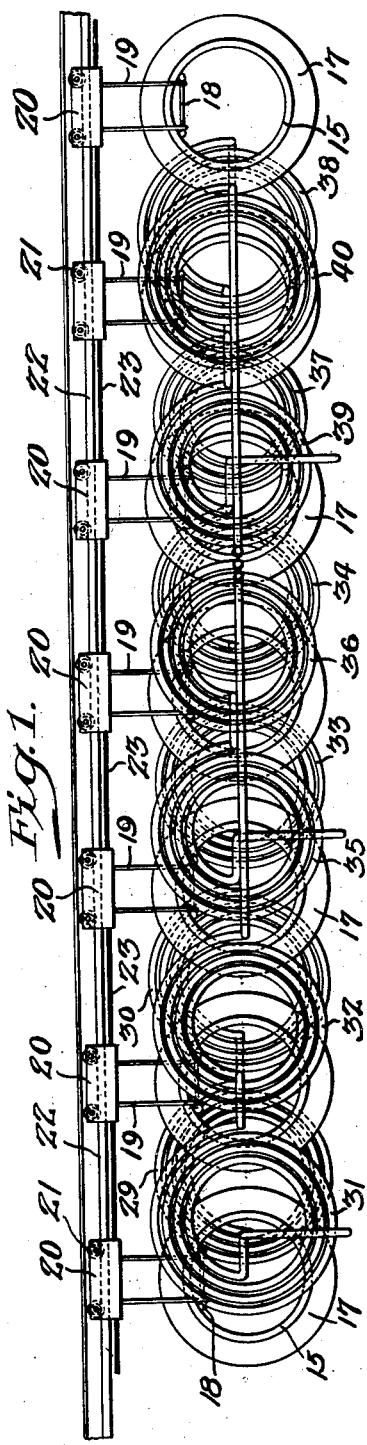
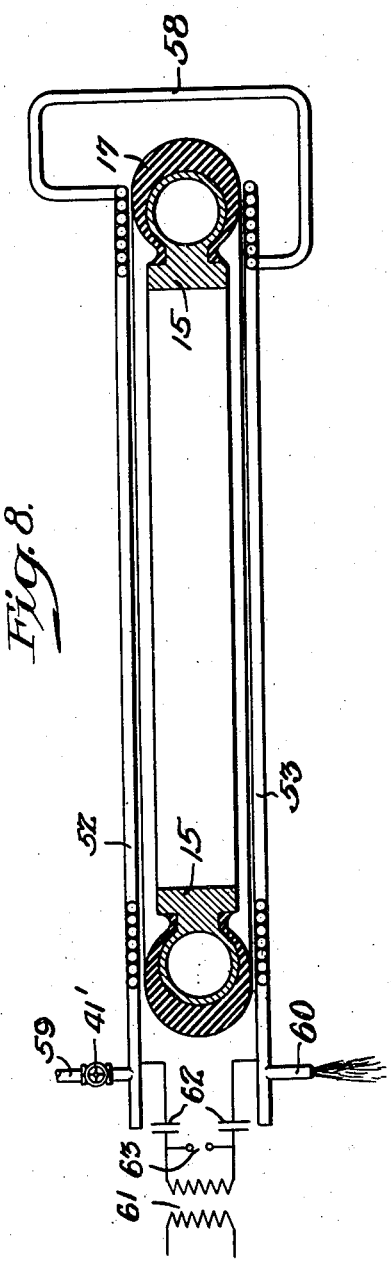
Inventor:
Edwin F. Northrup
by ... Attorney

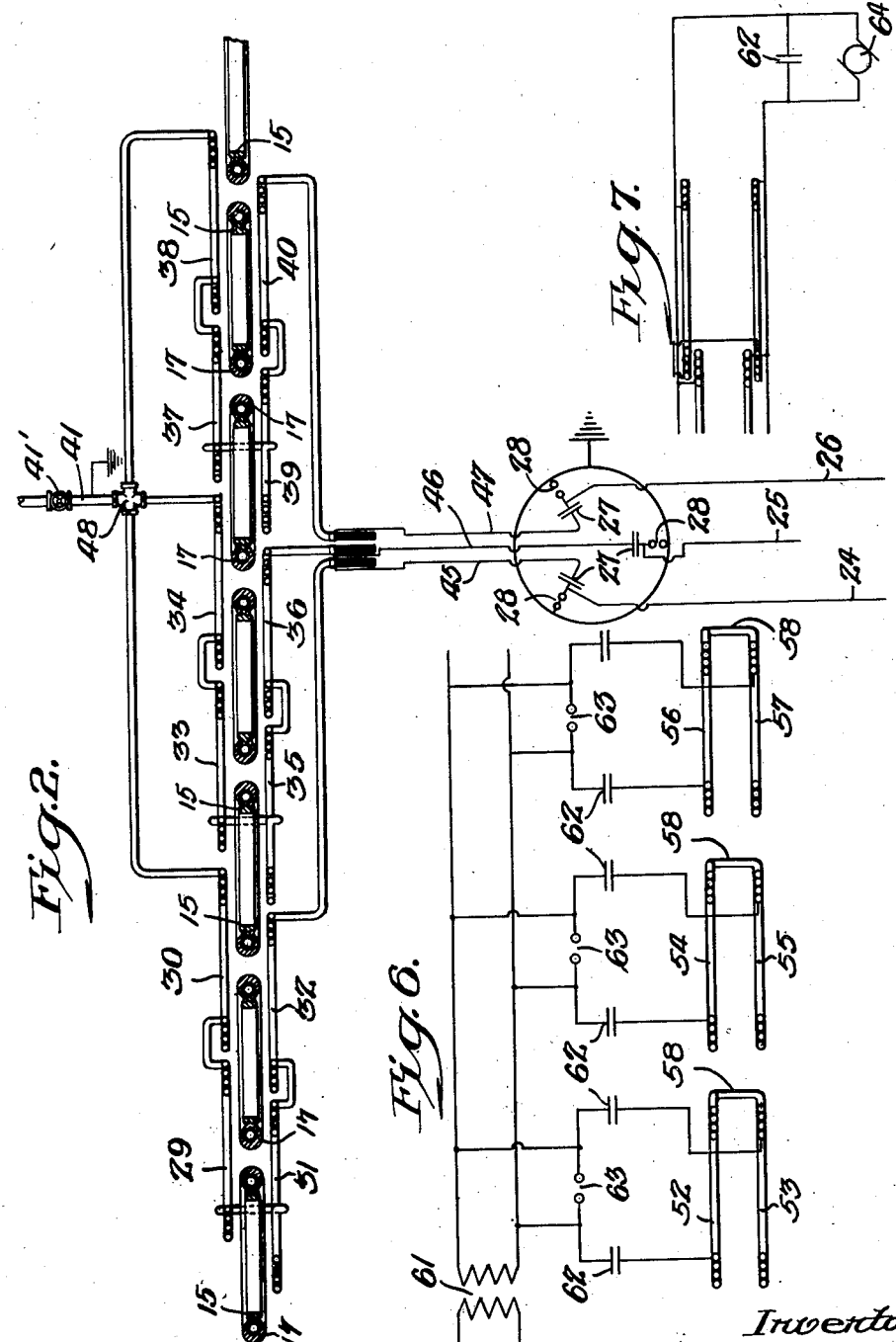

Dec. 22, 1925.
E. F. NORTHRUP
1,566,500
INDUCTION HEATER FOR AND METHOD OF HEATING TIRE MOLDS
Filed Nov. 20, 1920        4 Sheets-Sheet 3
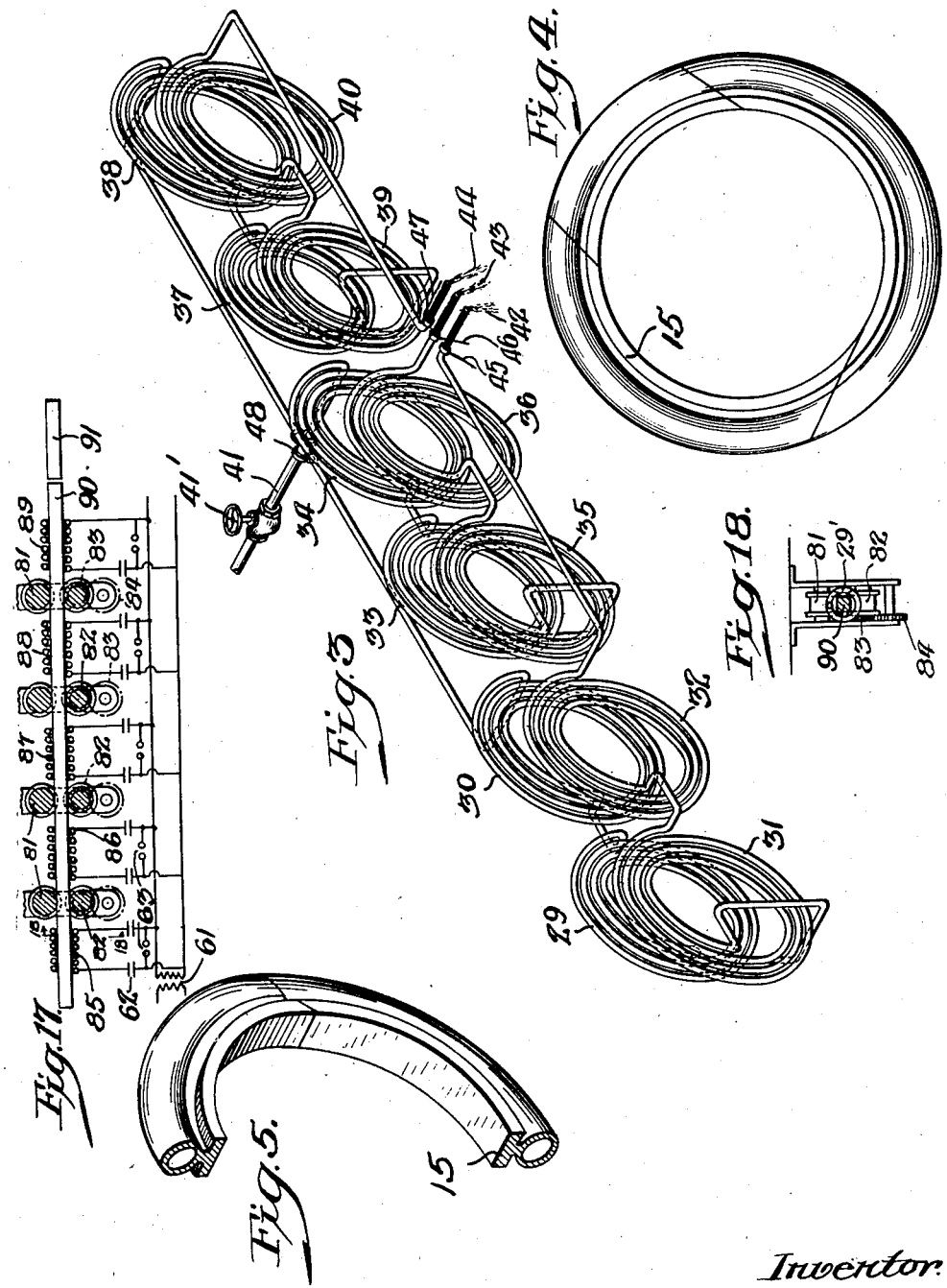
Inventor:
Edwin F. Northrup.
by Ed Stuel Jackson
Attorney.

Dec. 22, 1925.
E. F. NORTHRUP
1,566,500
INDUCTION HEATER FOR AND METHOD OF HEATING TIRE MOLDS
Filed Nov. 20, 1920 4 Sheets-Sheet 4
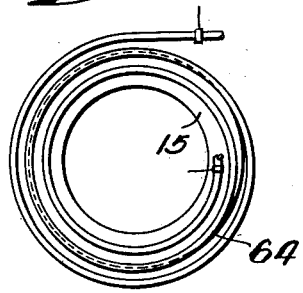
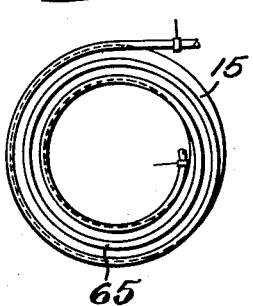
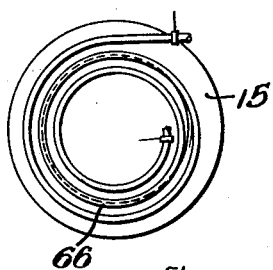
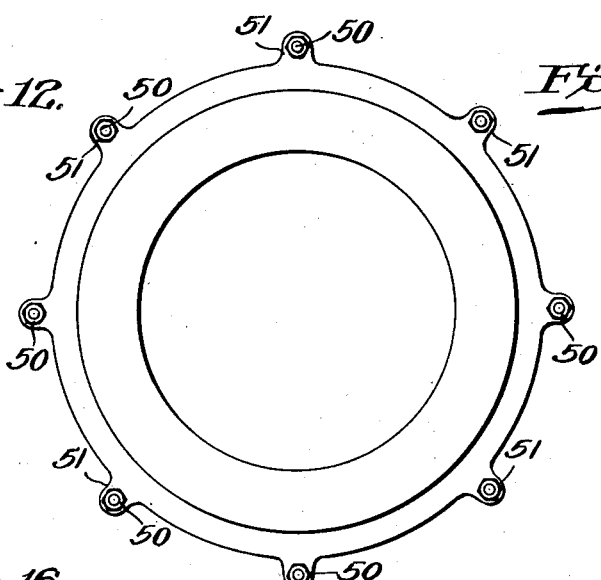
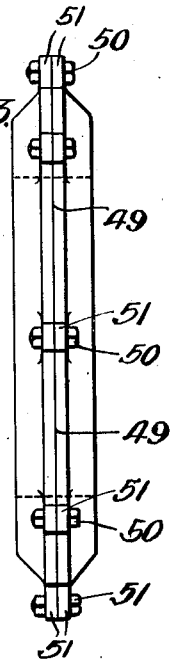
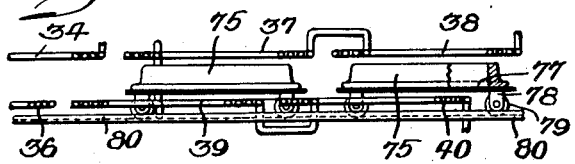
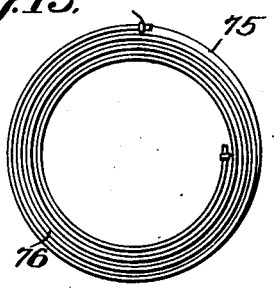
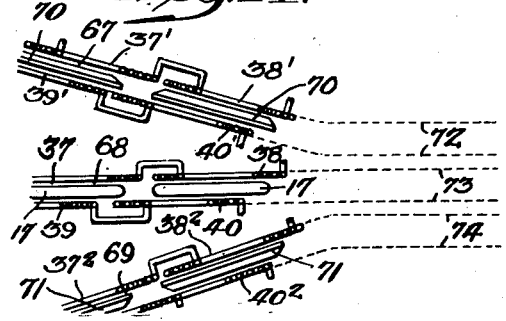
Inventor:
Edwin F. Northrup.
by
Attorney Patented Dec. 22, 1925.

1,566,500

UNITED STATES PATENT OFFICE.

EDWIN FITCH NORTHRUP, OF PRINCETON, NEW JERSEY, ASSIGNOR TO AJAX ELECTROTHERMIC CORPORATION, OF TRENTON, NEW JERSEY, A CORPORATION OF NEW JERSEY.

INDUCTION HEATER FOR AND METHOD OF HEATING TIRE MOLDS.

Application filed November 20, 1920. Serial No. 425,439.

*To all whom it may concern:*

Be it known that I, EDWIN F. NORTHRUP, a citizen of the United States, residing at 30 Wiggins St., Princeton, in the county of Mercer and State of New Jersey, have invented a certain new and useful Induction Heater for and Method of Heating Tire Molds, of which the following is a specification.

My invention relates to heaters using high frequency current, with an application to heaters for annular articles of which good examples occur in locomotive tires and in tire molds, such as are used for vulcanizing pneumatic tires.

One purpose of my invention is to integrate in a single article the successive heating effects of a plurality of distributed high frequency electric heaters through whose fields the article is passed.

Another purpose is to heat electrically-conducting annular articles, including inner tire molds in position within the tires, by electrical induction from a high frequency current. The article heated may thus be the ultimate article manufactured or may be a tool or apparatus for treating the ultimate article.

A further purpose is to apply induction from high frequency electric current to annular articles typified by tires and tire molds while they and the coils through which the induction is applied are moved relatively with respect to each other—preferably while the tires or molds and tires are passing to the point of intended encasement within the outer molds.

A further purpose is to mount coils through which alternating electric current is to be passed upon opposite sides of a path or track along which the annular articles such as tires, or inner molds and their tires are carried from the loading point to a point where they are delivered at the intended temperature, regulating the temperature by regulation of the speed of transfer, the current supplied or any other means.

A further purpose is to apply multi-phase current through water cooled coils in inductive relation to a tire or rubber covered mold, preferably applying or releasing the water at the neutral point of the multi-phase system.

A further purpose is to induce current by a high frequency coil whose turns are in line axially with an annulus to be heated and the mean diameter of whose turns is determined by the mean diameter of that portion of the annulus to which the heat is to be particularly applied. The cylindrical zone of induction set up may thus be given maximum effect or desirable uniformity of heating may be secured.

Further purposes will appear in the specification and in the claims.

My invention relates to the methods involved as well as to mechanism by which the method may be carried out.

In the drawings I have preferred to illustrate several variations of one general form only among the many in which it may be carried out, selecting a form which is practical, efficient, reliable and economical of space and current and which at the same time well illustrates the principles of my invention.

Figure 1 is a side elevation of a mechanical structure illustrating my invention.

Figure 2 is a horizontal section of a structure corresponding to Figure 1 with diagrammatic connections.

Figure 3 is a perspective view of part of the mechanism shown in Figures 1 and 2, omitting the tires and molds, and supporting mechanism and showing water connections.

Figure 4 is a side elevation of a tire mold which is to be heated.

Figure 5, is a sectional perspective of the same ring.

Figure 6, is a horizontal section with diagrammatic connections showing the heating coil similar to those of 1-3 with diagrammatic single phase multiple connections condenser and discharge gap.

Figure 7 is a view corresponding in part with Figure 6 but showing single phase generator current supply in multiple.

Figure 8 is an enlarged sectional view of a single pair of coils with a mold and tire and with diagrammatic single phase current supply.

Figures 9, 10 and 11 are side elevations of coils illustrating different proportions of the coils with respect to the molds heated to secure different heating effects.

Figures 12 and 13 are side and end elevations respectively of an outer mold which may be heated by my method and apparatus.

Figure 14 is a top plan view of apparatus for heating both outer and inner tire molds.

Figure 15 is a side elevation of a coil applied to a locomotive tire.

Figure 16 is a side elevation of horizontal coils and track for heating locomotive tires.

Figures 17 and 18 are longitudinal and transverse sections, respectively, of a construction for heating rods in which the effect of successive coils is integrated. The figure is partly diagrammatic.

An excellent illustration of the advantage of integrating the heating effect of successive coils occurs in the heating of the molds during the making of the outer shoes of pneumatic tires.

In the vulcanizing of tires it is customary to place the tires upon a metal internal mold 15 such as is shown in Figure 4, surround them by an external mold 16 such as is shown in Figures 12 and 13 and then heat the combined mass within an oven by superheated steam until vulcanization has taken place. As the internal mold receives its heat exclusively by conduction from the outer mold it heats slowly from the outer mold with the result that the outer part of the tire is heated to a vulcanizing temperature long before the inner mold is raised to any such temperature and the outer part of the tire is given excessive treatment relative to the interior thereof. This difference in the treatment affects the quality of the tire. In addition a relatively excessive time is taken for the operation.

My invention is designed to overcome this objection by initial heating of the inner mold preferably to or above a vulcanizing temperature with the tire in place upon the mold before the tire and inner mold are placed within the outer mold, so that quick heating of the outer mold may take place either by my method or by any other without necessity for also heating the inner mold through the outer mold. This secures a much closer approach to uniformity in temperature and length of time of treatment of all parts of the tires than by the existing methods.

It is my purpose to apply electrical induction to the annulus, whatever it be, here the tire mold through coils approximating in diameter the diameter of the inner mold itself and to apply the induction from opposite sides of the mold by coils between which the mold is located and past which the mold is preferably moved during the heating operation. I find that the heating is much more effective when high frequency currents are applied and illustrate my invention in connection with a high frequency source of supply.

Taking up the illustration of Figures 1 to 3; I mount the tire 17 upon the mold 15 and support the combined mold and tire in a vertical plane by any convenient means such as a frame 18 and rods 19, extending upwardly to the carriers 20. The carriers are shown as resting through rollers 21 upon a track 22, the whole mechanism being considered as typical of any carrier system. So that I may move the different elements of the carrier system forward as desired to carry the molds and tires edgewise, I connect the carriers at 23, forming a system by which the several tires 17 and their inner molds may be moved forward regularly, if desired, or by intermittent action to hold them in position for electrical heating treatment as preferred.

The mechanism of Figures 1 to 3 with its staggered coils on opposite sides of the tires is designed for continuous progress of the tires and molds from a loading point to a point of delivery at which they are to be enclosed within the outer tire molds. Whether this progress be continuous or intermittent there will be successive additions of heating effect from the successive coils, which effects will be summed up or integrated in the mold as finally heated, carrying out one form of my broad invention. The effect will be better in a magnetizable article than in one which is merely electrically conductive, both because of the relatively high resistance of iron and steel and because of the hysteresis present there.

In the form shown in Figures 1 to 3, I have applied three phase high frequency current obtained from any three phase low frequency star supply 24, 25 and 26 charging condensers 27 and discharging through gaps 28. The high frequency current thus obtained is applied to the molds through coils which are here shown as arranged in staggered groups of four coils each, two on one side of the path and two on the other, the series being repeated if desired to form as many coils as needed. The coils for one phase are shown at 29 and 30 on the far side of the path and at 31 and 32 upon the near side. The coils of the next phase are shown at 33 and 34 on the far side and at 35 and 36 upon the near side, and the coils of the third phase are shown at 37, 38 upon the far side and at 39 and 40 upon the near side.

Though this is a convenient form of placing the coils and extends the group to a total of twelve coils covered by one three phase supply, providing a considerable travel of the tires and molds, it will be evident that many other forms may be used, with fewer or more coils per phase, with a different number of phases, single, two phase or greater, and with successive groups of coils or sets of coils in series or in parallel to cover the desired extent of tire mold travel, as the wish of the designer or the needs of the particular installation may dictate. The tires may also be carried to their positions to receive the induction, heated either all at one time or in several different positions between several stages of movement and then be moved to place for insertion within the outer molds.

In the form shown in the figures the coils are made of pipes so as to form a water cooling system, the water being shown as drawn through a grounded pipe 41 representing the neutral point of the star system and being discharged at 42, 43, 44 at or near the points of application of several phases of current. The flow of water is controlled by valve 41'. It has been my experience that the conductivity of ordinary faucet water to high frequency current is so low that a few feet of clear discharge or of flow through an insulating pipe is sufficient so that no substantial leakage will take place.

The connections from the condensers to the conductor pipes are made by wires 45, 46 and 47. Following out the connections from terminal 42, the current passes to coil 32, through this coil and thence to and through coils 31, 29, and 30 respectively to neutral connection 48. The current from terminal 43 passes through the pipe forming coils 36, 35, 33 and 34 respectively to neutral, and the current from terminal 44 passes through coils 40, 39, 37 and 38. All of these coils are so arranged as to give nearly opposite coils the same direction of induction and to form as little conflict between the inductions set up in adjoining coils as possible, with the effect and result that the inner mold passing through between the coils will be continuously subjected to induction having a high heating effect. With iron both hysteresis and eddy currents will be set up within the metal of the molds.

Water cooling of the coils prevents them from becoming heated, avoiding the injurious effect which excessive heating of the coils would have upon the rubber and maintaining uniform electrical conditions within the coils.

The staggering of the coils gives a more nearly uniform heating action than would otherwise be the case, though the overlapping of different parallel coils by each of the molds as it passes also tends to equalize the inductive effect upon the molds. Where the molds are not to be advanced regularly but are to be held stationary for a time between coils it is better not to stagger the coils.

In preferred operation, the tires are mounted upon the molds and are supported upon the carriers for movement along the track. When the current is turned on, the initial tires and molds are started at one end of the apparatus, say at the left end, and are fed toward the right end preferably at a regular speed determined upon in proportion to the temperature to which the molds are to be raised and the time in which this is to be accomplished at the selected rate of current input. The movement may, however, be intermittent with one stage or many stages. As the molds leave the coils, in the preferred operation they are delivered in regular succession for encasement in outer molds such as are shown in Figures 12 and 13.

Except in Figure 14, I have not shown these outer molds as heated by my method for the reason merely that the greater bulk and easier accessibility of these outer molds makes it possible to heat them readily by other means or to heat them after they have been placed about the tire and within the oven in which the vulcanizing operation is to be completed. However, as these outer casings are separable along the plane 49 and are held together by bolts 50 passing through lugs 51, the halves may very easily be heated separately or together by any method and applied hot upon opposite sides of the tire; in which event the halves of the pair forming a complete outer mold may be heated separately as in Figure 14 or together by my method, by passing them along upon a track through and between coils of the same character and available in the same variety as the coils and currents for heating the inner molds. The outer mold may also be heated by my method after the inner mold and tire have been placed within it. The question of whether my method be used for this purpose or not is one of economy chiefly.

The inner molds are also separable, as is usual in this art, and as shown in Figure 4, but this separability does not affect the heat treatment appreciably except that, with high frequency current, the joints heat less than the metal between the joints.

In order to illustrate the facts, that it is not necessary to have multi-phase current, since single phase current may be furnished through condensers and discharge gaps to separate coils or pairs or sets of coils, including a single pair or to any number of sets in parallel; and that the same flexibility extends in regard to generator current without discharge gap, I have illustrated several of these variations in Figures 6, 7 and 8.

In Figure 6 I have shown pairs of coils 52, 53; 54, 55, and 56, 57 in parallel, the coils of each pair being placed directly opposite each other, and connected as at 58, which may be used separately for heating individual molds or may be part of a system such as seen in Figure 8. The inlet 59 and discharge 60 are seen in the enlarged view of one pair in Figure 8 and correspond generally to the inlet and discharge for the first form. The current is furnished through a transformer 61, condensers 62 and discharge gaps 63. A single pair or any number of pairs of such a type are capable of use to heat a moving mold or molds or in "soaking" a mold or a number of molds for any required time to bring it or them to the desired temperature while the mold and coils are relatively immovable.

In the discharge gap I get the best results with an enclosed gap having a double spacing from mercury to secure the advantage of the high negative electrode resistance to break off the spark abruptly. Such a gap is shown in my copending application for patent for discharge gap, Ser. No. 175,518, filed June 18, 1917. However, I show it and the transformer conventionally with a view to covering any gap and any source of current which may be used.

In Figure 7 a generator is used at 64 with a condenser 62 thrown across its terminals, capable of supplying coils in series or in multiple or in combination of these connections, as with the other forms. Coils which are adjacent along the path of mold travel are here shown as slightly overlapping.

All of the constructions shown may be used to heat molds which are moved at intervals and which are stopped between movements so as to receive a maximum of induction; so that a part of the advantage of my process may be secured without continuity of movement and in fact without any movement during the time of heating.

In Figures 9, 10 and 11 the coils 64, 65, 66 are shown as of differing average diameter in order to concentrate the current induced therefrom in different annular zones (radially of the molds) to secure the results desired. Thus the means diameter of the coil 64 corresponds with the diameter of the outer part of the mold 15 with the result that the outer circumference will be heated first and the inner part of the mold will be heated chiefly by conduction therefrom.

The coil 65, on the other hand has its mean diameter agreeing substantially with the means diameter of the mold with the result that the mold will be heated nearly uniformly, the central section of the mold being heated first and greatest and the heat extending by conduction to the inner and outer perimeters.

In the case of coil 66, the mean diameter of the coil corresponds with the diameter of an inner part of the mold with the result that the inner flanges of the mold will be heated to the greatest extent and the heat will extend by conduction outwardly to the rest of the mold.

It will thus be seen that by varying the mean diameter of the coil or the area which the coil covers, as by coils of the character indicated, or combinations of coils, the induction may be concentrated upon any particular width of belt or zone desired in the mold to give the tire additional heat treatment or to heat it initially or most wherever desired.

The showing in Figures 12 and 13, already described, is, of course, the same whether the inner mold and tire be included or not.

In Figure 14 I show mechanism for heating and delivering both inner molds with tires upon them and outer molds ready for assemblage about the inner molds and tires. Suitable supporting and conveying mechanism (not shown) advances one set of outer mold halves along a pathway 67, the inner molds with their tires along a pathway 68 and the other set of half outer molds along a pathway 69, the outer half molds having their concavities towards each other ready for inclosure of the inner molds and tires. Coils 37 and 38 upon one side of the inner molds and tires and 39 and 40 upon the other, may be part of an extensive system of heating coils.

The outermold halves 70 and 71 are shown as acted upon by coils $37'$, $38'$, $39'$, $40'$ and $37^2$, $38^2$, $40^2$ respectively (the coil corresponding to $39^2$ not being shown). Each of these sets of coils may also be part of an extensive system; and the same capability exists of operating the system of Figure 14 continuously or step by step or by "soaking" the annular members treated and then advancing them to the point of delivery, as in the case of all of my other structures.

In any event, the parts heated may be delivered in positions 72, 73, 74 ready for inclosure of the heated inner molds with tires upon them within heated outer mold halves, for subsequent heat, maintenance by my mold or by ovens or any other means to complete the vulcanization.

In Figure 15 a locomotive tire 75 is shown as another good example of an annular member to be heated—as preliminary to shrinkage upon the wheel—and as another good example of a structure in which the heating effects of successive coils may be summed up or "integrated" in a common article which is passed from one to the other to receive their successive heating effects viewed as differentials. And this view of integrating is applicable whether the "differentials" be small or great and whether they overlap because of uniform movement of the article or coils or are separately applied with intermediate step by step advances. An individual coil for such a tire is shown at 76.

Figure 16 is intended to illustrate not only the application of heat to locomotive tires 75 through coils 34, 37, 38 on one side and 36, 39 and 40 on the other, but also to indicate that the character of the track or other device, or of the carrier used to progress the articles and coils relatively, does not or need not affect my methods of integration of heating effects and of applying the heat to annular objects.

In the illustration, the tires are placed upon horizontal platforms 77 preferably of insulated material, forming floors of trucks supported by feet 78 and wheels 79 from any suitable horizontal track 80. Any connecting mechanism and means of securing movement may be used or the device may be moved by hand. This is true also of the form shown in Figure 1.

In Figures 17 and 18 I have shown my method of integrating the heating effects of successive coils through which high frequency current is passed, in the heating of a bar or rod which is advanced or progressed, either continuously or intermittently as preferred, as by sets of rollers 81 and 82, suitably mounted, and one of them driven by any suitable gearing here typified by gears 83 and 84, of which 83 is on the same shaft as the feed rollers 82. The coils 85, 86, 87, 88 and 89 are here shown as helical coils nearly fitting the bar, wire, rod or strip 90. I have not considered it necessary to illustrate the protecting covers for preventing undue cooling of the bar, etc. between the coils as this could exist in great variety. Obviously the coils could be water cooled if desired, as in the annular coils shown. The coils could be one long coil if the rate of speed of the article permit this.

Such a mechanism as described is suitable, for example, for heating a bar, rod or wire from which nails or spikes are to be made; and one portion 91 of the bar or rod is separated as would be the case in the making of spikes.

Both hysteresis and eddy currents would be present and the bar, rod or wire would be delivered continuously or intermittently to the cutting or gripping mechanism of the nail or spike machine at any temperature designed as required for the heading and pointing operations.

It will be evident that my method and mechanism are capable of use generally to heat or heat treat electrically conducting objects in motion or which are moved step by step between the treatments, whether they be magnetizable or not; that the treatment may be applied to special forms of objects to be treated by accommodation of the coils to these forms; and that the materials primarily to be treated, when not electrically conducting, may be treated by mounting them on or encasing them within electrically conducting objects in which the heat is developed.

It will be further evident that the application of my process and the character of apparatus may both be greatly varied, in the light of the disclosure herein, suiting to the needs of individual installations or the preferences of the designers. And I desire to include herein all such forms and variations which come within the reasonable spirit and scope of my invention.

Having thus described my invention, what I claim as new and desire to secure by Letters Patent is:—

1. The method of integrating successive heating effects from spaced electrical heating devices upon successive molds to be heated which consists in moving the heating devices and the molds to be heated with respect to each other, so as to bring the molds successively within the electromagnetic field of each of said spaced devices.

2. The method of electrical heating electrically conductive molds by high frequency current which consists in setting up a plurality of fields of induction by passing high frequency current through coil-like paths spaced one from another to set up separate fields and in passing the molds to be heated from a position within the inductive influence of one field to positions within the inductive influence of successive fields to integrate the successive heating effects of the separate fields.

3. The method of inductively heating electrically conductive molds by high frequency current which consists in progressively advancing the molds through spaced fields produced by high frequency electric current to sum up the eddy current heating effects of the successive fields upon the molds.

4. The method of heating electrically conductive molds by high frequency electric current which consists in advancing the molds continuously through spaced inductive fields produced by high frequency electric current, summing up the eddy current heating effects of successive fields upon the molds and increasing its temperature as it is advanced.

5. The method of heating electrically conductive molds by high frequency electric current which consists in advancing the molds continuously step by step through spaced inductive fields produced by high frequency electric current, summing up the eddy current heating effects of each field upon the molds and increasing their temperatures as they are advanced.

6. The method of heating an electrically conductive mold and delivering it hot at the point of use which consists in feeding the mold progressively through a succession of spaced fields of force produced by high frequency electric current and timing the rate of progression, the electrical input of each field and the number of fields to deliver the mold at the required temperature.

7. The method of heating a paramagnetic mold by electric current which consists in advancing the mold through a plurality of spaced fields induced by high frequency electric current to heat the mold by the summation of the hysteresis and eddy current heating effects from the successive fields.

8. The method of heating annular molds which consists in subjecting them to axially-extending, cylindrical zones of electro-magnetic force and at the same time moving them transversely to their axes and the axes of the cylinders.

9. The method of heating tire molds, which consists in moving the molds in the planes of their radii while inducing electric current across them.

10. The method of heating tire molds, which consists in moving the articles in the planes of their radii through a field of high frequency inductive force.

11. The method of heating tire molds, which consists in moving the articles in the direction of the planes of their radii through a plurality of adjacent high frequency electric fields.

12. The method of heating tire molds, which consists in moving the articles in the direction of the planes of their radii through a plurality of adjacent, high frequency, overlapping electric fields.

13. The method of heating tire molds, which consists in setting up a plurality of closely adjacent electric fields each corresponding approximately to their size and in moving the articles slowly through the fields edgewise.

14. The method of heating tire molds, which consists in arranging coils for inductive transfer of electric energy in closely adjacent pairs upon opposite sides of a path, and in supporting the molds in the path and transferring them edgewise from pair to pair to receive the inductive effects of the pairs.

15. The method of heating tire molds, which consists in passing currents of electricity about circular paths having diameters approximately equal to the diameters of the molds and located on opposite sides of them, while the molds are moved slowly edgewise through the field.

16. The method of heating tire molds, which consists in passing high frequency electric current through circular paths in adjacent pairs, the pairs being separated and the diameters of the circular paths corresponding approximately to the diameters of the molds and in moving them edgewise from the field produced by one pair through the field produced by the next adjacent pair to heat the molds.

17. The method of heating tire molds, which consists in passing high frequency electric current through opposite sets of circular paths, the paths on opposite sides being separated and the diameters of the circular paths corresponding approximately to the diameter of the tires or molds and paths on opposite sides overlapping, and in moving the molds edgewise from the field produced by one set through the field produced by the next adjacent set to heat the molds.

18. The method of heating tire molds, which consists in utilizing the separate phases of a multi-phase high frequency electric current to set up pairs of circular paths of current flow, the paths from one phase adjoining those of the next phase and moving the molds edgewise through the space between the paths of the pairs to receive induction successively from the different phases.

19. The method of heating tire molds, which consists in utilizing the separate phases of a multi-phase high frequency electric current to set up opposite overlapping paths of current flow, the paths from one phase adjoining those of the next phase and moving the molds edgewise through the space between the paths of the pairs to receive induction successively from the different phases.

20. The method of heating tire molds, which consists in utilizing the separate phases of a multi-phase high frequency electric current to set up circular paths of current flow on opposite sides of a space through which the molds may be moved, the paths from one phase adjoining those of the next phase and moving the molds edgewise through the space between the paths to receive induction successively from the different phases, and cooling the conductors through which the current is passed by a cooling liquid.

21. The method of heating metal tire molds, which consists in moving the molds upon which the tires are mounted edgewise through a passage while they are subjected to high frequency electric induction.

22. The method of heating metal tire molds, which consists in passing the molds with the tire mounted upon them edgewise through a passage while they are subjected to high frequency electric induction from current traveling in circular paths at the side of the passage of diameter approximating the diameter of the molds.

23. In the vulcanization of rubber tires the method which consists in mounting the tires upon their molds and exposing the molds with their tires upon them to high frequency electrical induction at the same time that the mold is transferred across the field induced.

24. In the vulcanization of rubber tires, the method which consists in supporting a tire shoe upon an inner annular metal mold and moving the mold edgewise with the tire upon it through a plurality of high frequency annular fields of force.

25. In the vulcanization of rubber tires, the method which consists in supporting a tire shoe upon an inner annular metal mold, producing a plurality of overlapping annular fields of electro-magnetic force and moving the mold edgewise with the tire upon it through the fields of force.

26. In the vulcanization of rubber tires, the method which consists in mounting a tire shoe upon an inner mold, moving the mold edgewise and heating the mold while it is being moved edgewise, and in subsequently surrounding the tire mold by an outer mold and concluding the vulcanization by heating the outer tire mold.

27. In the vulcanization of rubber tires, the method which consists in mounting a tire shoe upon an inner mold, moving the mold edgewise and heating the mold while it is being moved edgewise, heating the outer tire mold, applying the heated outer mold to the inner mold and tire and subsequently completing the vulcanization by maintaining the heat of the parts.

28. In the vulcanization of rubber tires, the method which consists in heating the inner tire mold with the tire in position upon it, in separately heating the outer tire mold, in applying the heated outer tire mold to the tire and inner mold and in continuing to apply heat to the outer tire mold during the completion of the vulcanization.

29. In the vulcanization of rubber tires, the method which consists in heating the inner tire mold with the tire upon it while the parts are stationary and in subsequently moving the tire and mold to a point where they are to receive the outer tire mold for the completion of the vulcanization.

30. In the vulcanization of rubber tires, the method which consists in intermittently moving the inner tire mold and tire upon it, stopping the movement to apply electro-magnetic induction for the heating of the mold and delivering the tire and mold when heated for application of the outer tire mold and completion of vulcanization.

31. The method of electrically heating tire molds which consists in passing high frequency electric current through successive annular paths extending along the length of the passage on one side thereof and through overlapping non-registering annular paths upon the opposite side thereof and in moving the mold through the passage transversely to the non-registering fields of force set up thereby.

32. A source of high frequency electric current, coils fed thereby setting up spaced fields of force and means for progressing a mold to be heated through the fields of force, so as to bring it successively within the fields of different coils.

33. In apparatus for heating electrically conductive tire molds, a pair of annular coils approximately opposite each other, and a source of high frequency electric current connected to the coils to give cooperative magneto-motive force across the space from both coils, and a carrier for supporting the mold to be heated between the coils.

34. In apparatus for heating electrically conductive tire molds, a pair of annular coils approximately opposite each other, and a source of high frequency electric current connected to the coils to give cooperative magnetomotive force across the space from both coils, and a carrier for supporting the mold to be heated between the coils and moving it transversely to the axes of the coils.

35. In mechanism for heating electrically conductive tire molds, a pair of electrically connected coils placed on opposite sides of a space within which the articles may be placed, and having their axes out of line, to cause the fields of the coils to overlap without registration, in combination with a source of high frequency current for the two coils.

36. In mechanism for heating electrically conductive tire molds, a pair of electrically conductive coils placed on opposite sides of a space within which the mold may be placed, and having their axes out of line, to cause the fields of the coils to overlap without registration, in combination with a source of high frequency current for the two coils and a support for the mold to be heated.

37. In mechanism for heating electrically conductive tire molds, a pair of electrically conductive coils placed on opposite sides of a space within which the mold may be placed, and having their axes out of line to cause the fields of the coils to overlap without registration, in combination with a source of high frequency current for the two coils, a support for the mold to be heated within the space, and a carrier for moving the annulus through the space.

38. A multi-phase heating system for electrically conducting tire molds, comprising a plurality of coils arranged on opposite sides of a passage way and a source of multi-phase high frequency current therefor, setting up the inductance from different phases in coils adjacent longitudinally of the passage, and a carrier adapted to move the molds to be heated longitudinally of the passage, successively through the fields set up by different phases of the current.

39. In mechanism for heating electrically conductive tire molds by high frequency current, a plurality of annular coils, having their planes parallel, a source of high frequency current for the coils and a carrier adapted to move the molds to be heated across the axes of the coils from one coil to another.

40. In mechanism for heating electrically conductive tire molds by high frequency current, a plurality of coils on one side of the passage way, a plurality of coils on the opposite side thereof, spaced so as to provide induction transversely of the passage way over a path longer than the greatest dimension of the coils, a high frequency source of electrical supply for the coils and a carrier for feeding the molds into the passage.

41. In mechanism for heating electrically conductive tire molds by high frequency current, a plurality of coils on one side of the passage way, a plurality of coils on the opposite side thereof, spaced so as to provide induction transversely of the passage way over a path longer than the greatest dimension of the coils, a high frequency source of electrical supply for the coils and a carrier for feeding the molds into the passage and moving them longitudinally thereof while they are being acted upon by the induction.

42. In mechanism for heating annular electrically conductive tire molds, a plurality of annular coils arranged on opposite sides of a passage way and covering a greater length of passage way than the width of the coils, the coils having a mean diameter approximating that of the molds and a high frequency source of current for the coils.

43. In mechanism for heating electrically conductive annular tire molds, a plurality of annular coils arranged on opposite sides of a passage way and covering a greater length of passage way than the width of the coils, the coils having a mean diameter approximating that of the molds, a high frequency source of current for the coils and a carrier adapted to support the molds and move them into the passage way.

44. In a mechanism for electrically heating articles, a multi-phase source of high frequency electric current supply, a plurality of coils arranged on opposite sides of a passage and adjacent lengthwise thereof, alternating coils having different phases and the coils being hollow, and a source of liquid cooling supply for the coils connecting at a neutral point with respect to the phases.

45. In an apparatus for heating electrically conductive tire molds by high frequency current, three sets of coils having a common connection, in combination with a three-phase star-wound electric supply therefor having the common connection joined to the neutral point of the star and having the windings connected at their opposite ends to the points of the star through condensers and discharge gaps.

46. In mechanism for heating electrically conductive tire molds by high frequency, a multi-phase electric current and a plurality of sets of coils arranged lengthwise along a passage and corresponding in number of sets to the phases of the current, in combination with a source of multi-phase alternating electrical current, having a neutral point and connections of said current to the coils corresponding to the several phases, including condensers and discharge gaps.

EDWIN FITCH NORTHRUP.